F. Grosjean,
Spoon.
No. 1,509. Reissued July 7, 1863.
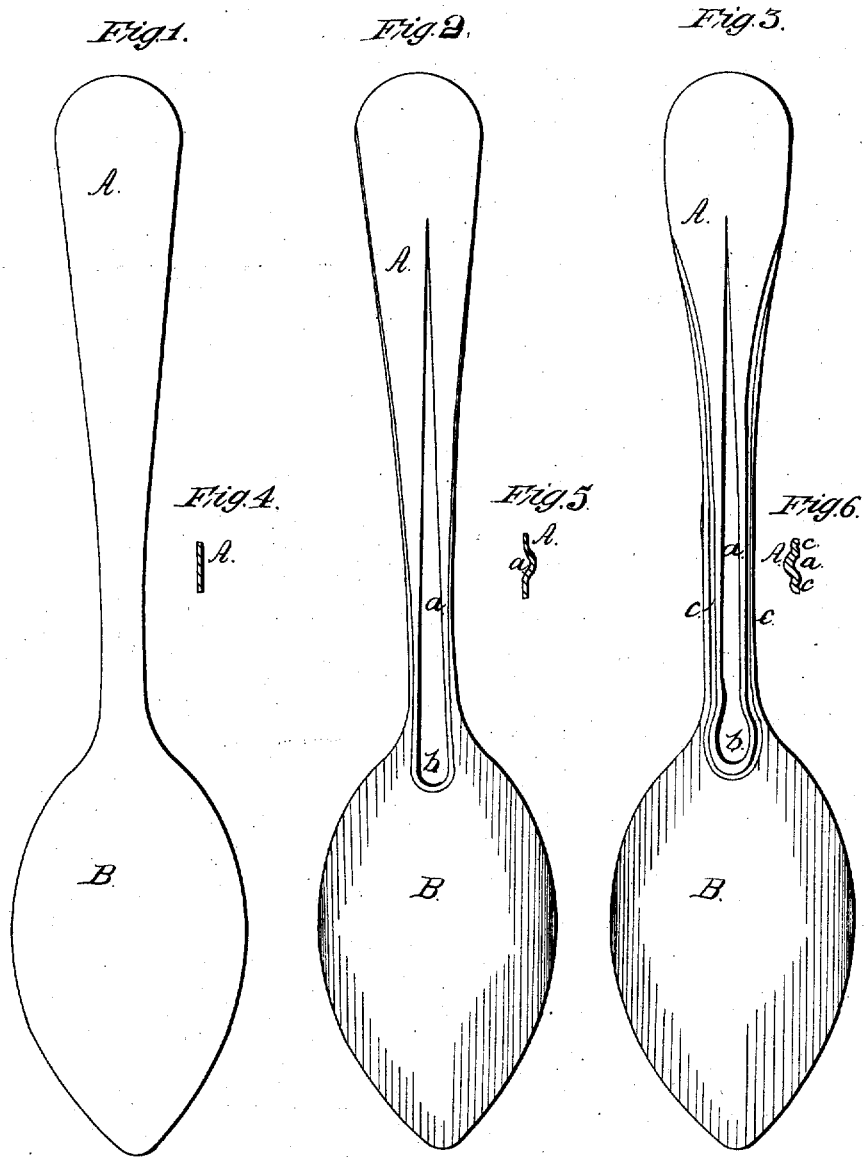
N. PETERS, PHOTO-LITHOGRAPHER, WASHINGTON, D. C.

UNITED STATES PATENT OFFICE.

FLORIAN GROSJEAN, OF NEW YORK, N. Y.

IMPROVEMENT IN SHEET-METAL SPOONS.

Specification forming part of Letters Patent No. 34,252, dated January 28, 1862; Reissue No. 1,509, dated July 7, 1863.

*To all whom it may concern:*

Be it known that I, FLORIAN GROSJEAN, of New York, in the county of New York and State of New York, have invented a new and useful Improvement in Constructing Sheet-Metal Spoons; and I do hereby declare that the following is a full and exact description thereof, reference being had to the accompany drawings, making part of this specification—

Figure 1 being a plan of the blank piece of the sheet metal from which the spoon is to be swaged; Fig. 2, a plan showing the spoon in its simplest form; Fig. 3, a corresponding view showing a spoon in its complete form; Figs. 4, 5, and 6, cross-sections of the handles, respectively, of the articles shown in Figs. 1, 2, and 3.

Like letters designate corresponding parts in all of the figures.

The nature of my invention consists in stamping or swaging the spoons from single pieces of sheet metal, with a middle corrugation or longitudinal ridge in the narrow or weaker part of the handle, and prolonged into the bowl of the spoon sufficiently far to give an equal or necessary strength to the junction of the handle and bowl, either leaving the metal flat between the said corrugation and the edges of the handle, or with a bead around said middle corrugation near the edges of the handle to give additional strength and finish to the appearance of the spoon.

In the drawings the blank, Fig. 1, has nothing peculiar in form. The principal or essential feature of the invention is the middle corrugation or raised ridge, *a*, which extends from a suitable point toward the end of the handle A, longitudinally along the middle of the narrow or weaker part thereof, and down into the bowl B of the spoon, as at *b*, far enough to give the necessary strength (or at least equal to that of the handle) at the junction of the handle and bowl, gradually tapering and shallowing out, so as to leave the bowl sufficiently smooth. This prolongation of the corrugation or ridge is of the utmost consequence, or, rather, absolutely necessary to the proper strength and durability of the spoon. A general idea of the depth and shape of the corrugation may be obtained by examining Fig. 5. The handle is flat on both sides of this corrugation, so that it is of neat and desirable form.

Spoons of this simple construction, as in Fig. 2, are good and serviceable; but I generally prefer to add a thread or bead, *c*, as indicated in Figs. 3 and 6, around the middle corrugation, *a*, near the edges of the handle. This bead should extend around the corrugation in the bowl, and along the narrow part of the spoon-handle, and may for good appearance continue around the entire edge of the handle. This bead adds strength to the spoon-handle, and junction with the bowl, and gives a finish to the whole appearance of the spoon, which is generally preferred; but I do not confine myself to its use.

This improvement is obviously applicable also to sheet-metal forks, the corresponding parts being formed in the same way as those of the spoons.

The improvement enables spoons and forks of strength, durability, and good shape to be made in the cheapest manner known.

I do not claim mere beads or ornaments formed in or on the surface of the spoon or fork handles made of rolled or cast metal; nor do I claim any indentation of sheet-metal spoon-handles in any manner substantially failing to fulfill the ends herein specified; but

What I claim as my invention, and desire to secure by Letters Patent, is—

Stamping or swaging spoons of single pieces of sheet metal with a middle corrugation or raised ridge, extending along the narrow or weaker part of the handle, and prolonged into the bowl of the spoon, so as to give full strength to the junction of the bowl and handle either leaving the handle flat on both sides or with a bead around the middle corrugation, substantially as and for the purposes herein specified.

The above specification of my improvement in the construction of sheet-metal spoons signed by me this 25th day of February, 1863.

F. GROSJEAN.

Witnesses:

A. LEWIS,

A. E. JUILLERAT.